United States Patent Office 2,945,037
Patented July 12, 1960

2,945,037
NEW PHTHALAZINIUM COMPOUNDS

Jean Druey, Riehen, and Hans Ulrich Daeniker, Basel, Switzerland, assignors to Ciba Pharmaceutical Products, Inc., Summit, N.J.

No Drawing. Filed Dec. 13, 1957, Ser. No. 702,543

Claims priority, application Switzerland Jan. 10, 1957

11 Claims. (Cl. 260—250)

This invention relates to new phthalazinium compounds. More particularly it concerns phthalazinium compounds in which an aliphatic hydrocarbon radical having a chain of at least 4 carbon atoms is bound to the quaternary nitrogen atom, and also the pseudo-bases derived therefrom. In the new compounds the phthalazine radical may contain further substituents, for example, a ring fused on to it, but the phthalazine radical is preferably unsubstituted. The aliphatic hydrocarbon radical may be saturated or contain carbon-to-carbon multiple bonds. It is preferably saturated and advantageously contains not more than 30 carbon atoms, and more especially 10-22 carbon atoms. This aliphatic hydrocarbon radical is unsubstituted or contains as a substituent especially at the end carbon atom, a free or esterified carboxyl group, and more particularly a lower carbalkoxy group.

The new compounds possess valuable pharmacological properties. Thus, they have a strongly antibacterial action, for example, against *Staphylococcus aureus* and *Esch. coli*, and are useful as disinfecting agents or medicaments with antibacterial activity. Furthermore, they intensify the immunizing reactions caused by antigens in that, for example, they intensify the formation of antibody. They can therefore be used, for example, as additions to vaccines.

A specific and preferred embodiment of our invention are compounds of the formula

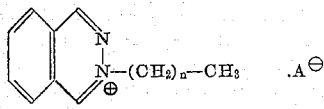

in which *n* represents a whole number from 9 to 21, and A represents the anion of an acid, such as those of pharmaceutically acceptable acids, e.g. hydrohalic acids, for example, hydrochloric acid, hydrobromic acid or hydriodic acid, sulfuric acid or the anion of an organic acid, such as an alkyl-sulfonic acid, for example, methane or ethane sulfonic acid, or an aryl-sulfonic acid, for example, para-toluene sulfonic acid or naphthalene sulfonic acid, or acetic acid, oxalic acid, tartaric acid, citric acid, benzoic acid or naphthalene carboxylic acid, or the anion of an alkyl sulfuric acid, for example, methyl sulfuric acid. Preferred compounds are n-decyl-, lauryl-, stearyl- and docosanyl-, phthalazinium salts, especially the hydrohalides such as hydrochlorides.

The new compounds are obtained in a customary manner by reacting a phthalazine with a compound of the formula Hal—R, in which Hal represents chlorine, bromine or iodine and R represents the aliphatic hydrocarbon radical having a chain of at least 4 carbon atoms described above.

The new compounds can also be made by reacting an ortho-phthalaldehyde with a compound of the formula H₂NHN—R, in which R has the meaning given above, and which compound may be used in the form of a salt thereof.

The reactions are advantageously carried out in the presence of a diluent, at ordinary or at raised temperature, and if desired in a closed vessel under pressure.

Depending on the reaction conditions used the new compounds are obtained in the form of their quaternary salts or their free ammonium hydroxides. The invention includes, however, also their pseudo-bases, of which the formula can be illustrated by giving an unsubstituted phthalazine as an example:

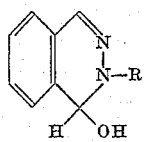

The quaternary salts can be converted in the usual manner, for example, by treatment with an alkali, such as an alkali carbonate or hydroxide, or other suitable metal hydroxide or carbonate, or by means of anion-exchangers, into their hydroxides or pseudo-bases, or by treatment with appropriate anion-exchangers into other salts. The pseudo-bases or ammonium hydroxides can be converted into their quaternary salts by treatment with acids, such as hydrohalic acids, sulfuric acid, nitric acid, phosphoric acid, acetic acid, propionic acid, oxalic acid, malic acid, tartaric acid, citric acid, methane sulfonic acid, ethane sulfonic acid, hydroxyethane sulfonic acid, benzoic acid, salicylic acid, para-aminosalicylic acid or toluene sulfonic acid.

The new compounds can be used as disinfecting agents in the form of industrial preparations or as medicaments in the form of pharmaceutical preparations. The pharmaceutical preparations contain the new compounds in admixture with, for example, a pharmaceutical organic or inorganic solid or liquid carrier suitable for enteral or parenteral administration. For the carriers there are used substances which do not react with the new compounds, for example, water, gelatine, lactose, starches, magnesium stearate, talc, vegetable oils, benzyl alcohols, gums, polyalkylene glycols, cholesterol or other known carrier for medicaments. The pharmaceutical preparations may be made up, for example, in the form of salves, tablets, dragees or in liquid form as solutions, suspensions or emulsions. If desired, they may be sterilized and/or may contain auxiliary substances, such as preserving, stabilizing, wetting or emulsifying agents, or salts for regulating the osmotic pressure or buffers. They may also contain other therapeutically useful substances. The preparations can be made up by the usual methods. Thus the invention also comprises disinfecting preparations containing the new compounds together with a commercial carrier material, or pharmaceutical preparations containing them together with a pharmaceutical carrier material or a vaccine.

The starting materials used for making the new compounds are known or can be made by methods in themselves known. Advantageously there are used those starting materials which lead to the production of the final products mentioned above as being especially valuable.

The following examples illustrate the invention:

Example 1

13 grams of phthalazine and 27 grams of n-butyl iodide in 150 cc. of acetonitrile are boiled overnight under reflux. 150 cc. of water are then added and the excess of butyl iodide is removed by washing twice with 50 cc. of ether on each occasion. The pH value of the clear aqueous solution is then adjusted to 12 with caustic soda solution. After allowing the whole to stand for several hours at 0° C. the colorless lamellae which precipitate are filtered off with suction, washed well with water, dried in vacuo and finally crystallized from 250 cc. of ether. There are obtained 15 grams of 1-hydroxy-2-n-butyl-1:2-dihydrophthalazine in the form of colorless lamellae melting at 64–66° C. The resulting 15 grams of product are then dissolved in 25 cc. of absolute alcohol and 25 cc. of approximately 7 N-alcoholic hydrochloric acid are added. The whole is then evaporated to dryness and there is obtained a yellow oil which crystallizes in a short time. By reprecipitating the product twice with 100 cc. of acetone on each occasion there are obtained 12 grams of n-butyl-phthalazinium chloride in the form of colorless crystals melting at 64° C. In a similar manner other salts can be obtained, for example, the bromide, sulfate, oxalate, tartrate or toluene sulfonate.

Example 2

13 grams of phthalazine and 22.1 grams of n-decyl-bromide in 150 cc. of acetonitrile are boiled under reflux for 48 hours. Then 150 cc. of ether are added. The lamellae which crystallize out are filtered off after allowing the mixture to stand for a short time in an ice cabinet, and the crystals are dissolved in 250 cc. of warm water. 250 cc. of an aqueous solution of 10 percent strength of sodium bicarbonate are added, the whole is cooled to 0° C., the precipitated crystals are filtered off with suction and washed well with water and dried in vacuo. The product is then recrystallized from ether, and there are obtained 18.9 grams of 1-hydroxy-2-n-decyl-1:2-dihydrophthalazine melting at 78–79° C. 15.9 grams of the latter compound are dissolved in 100 cc. of a saturated solution of hydrogen chloride in methanol. The clear solution is evaporated to dryness. There is obtained an oil which is then crystallized from 100 cc. of acetone. The resulting crystals are recrystallized several times from acetone, and there are finally obtained 9 grams of n-decyl-phthalazinium chloride in the form of colorless needles melting at 93° C.

Example 3

1.3 grams of ortho-phthalaldehyde and 2.7 grams of n-decyl-hydrazinium sulfate are dissolved in 40 cc. of a mixture of equal parts of alcohol and water, and the whole is boiled under reflux for 4 hours. A small amount of animal charcoal is then added to the dark reaction solution, and the whole is boiled for a further 15 minutes and filtered. To the filtrate are added 20 cc. of an aqueous solution of 10 percent strength of sodium bicarbonate and the whole is cooled in ice. The crystals so formed are then filtered off with suction, washed well with water, dried and recrystallized from 80 cc. of ether. There are obtained, 1.3 grams of 1-hydroxy-2-n-decyl-1:2-dihydrophthalazine melting at 77° C. The compound is identical with the product described in Example 2 and can be converted into quarternary salts by the method described in that example.

Example 4

6.5 grams of phthalazine and 12.5 grams of dodecyl-bromide are dissolved in 100 cc. of acetonitrile, and the mixture is boiled under reflux for 48 hours. 100 cc. of ether are then added, the mixture is cooled, and the precipitated crystals are filtered off with suction and dried in vacuo. There are obtained 14.6 grams of dodecyl-phthalazinium bromide melting at 78° C., which is purified by reprecipitation from acetone.

By dissolving the above product in water and adding sodium bicarbonate there is obtained therefrom 1-hydroxy-2-dodecyl-1:2-dihydrophthalazine melting at 78° C.

Example 5

1.3 grams of ortho-phthalaldehyde and 2.7 grams of cetyl hydrazine sulfate are dissolved in 40 cc. of aqueous alcohol of 50 percent strength and the whole is boiled for 4 hours under reflux. A small amount of animal charcoal is then added, and the whole is boiled for a further 15 minutes and then filtered. The filtrate is rendered alkaline with sodium carbonate and cooled in ice. The crystals so formed are filtered off with suction, washed well with water and dried in vacuo. By reprecipitation from 200 cc. of a mixture of equal parts of ether and benzene there are obtained 1.6 grams of 1-hydroxy-2-cetyl-1:2-dihydrophthalazine melting at 80.5–82.5° C. 1 gram of the latter compound is dissolved with the aid of heat in 30 cc. of methanol saturated with hydrogen chloride, and then the whole is strongly cooled. The crystals so obtained are filtered off with suction and recrystallized twice from 12 cc. of acetone on each occasion. Cetyl-phthalazinium chloride is obtained in the form of colorless crystals melting at 70° C.

Example 6

13 grams of phthalazine and 33.5 grams of octadecyl bromide are dissolved in 150 cc. of acetonitrile and the whole is boiled for 40 hours under reflux. The whole is subsequently cooled to 0° C. whereupon crystallization rapidly occurs. The crystals are filtered off with suction, washed with a small amount of ice-cold acetonitrile, and dissolved in 1100 cc. of hot water. 250 cc. of an aqueous solution of 10 percent strength of sodium bicarbonate is added to the latter solution and the whole is allowed to stand for one hour at room temperature. The crystals so formed are then filtered off with suction, washed well with water and dried in vacuo. There are obtained 39 grams of 1-hydroxy-2-octadecyl-1:2-dihydrophthalazine, which melts at 80° C. after reprecipitation from a mixture of benzene and ether. 15 grams of the latter compound are dissolved in 100 cc. of methanol. To the resulting solution are added 100 cc. of a cold saturated solution of hydrogen chloride in methanol. Upon cooling colorless crystals are rapidly formed, and they are recrystallized from 250 cc. of acetone. There are obtained 13 grams of octadecylphthalazinium chloride in the form of colorless crystals melting at 97° C.

Example 7

1.3 grams of ortho-phthalaldehyde and 3.8 grams of octadecyl-hydrazine sulfate are dissolved in 40 cc. of equal parts of alcohol and water, the whole is boiled for 4 hours under reflux, and then a small amount of animal charcoal is added and the whole is filtered after being boiled for a short time. The filtrate is rendered alkaline with sodium carbonate and cooled in ice. The crystals so formed are dried and filtered off with suction to yield 4.0 grams of crude 1-hydroxy-2-octadecyl-1:2-dihydrophthalazine which melt at 82° C. after reprecipitation from 250 cc. of a mixture of benzene and ether (8:1) and is identical with the product described in Example 6. It can be converted into quaternary salts by the method described in that example.

Example 8

1.3 grams of ortho-phthalaldehyde and 3.8 grams of octadecenyl-hydrazine sulfate are dissolved in 40 cc. of aqueous alcohol of 50 percent strength and the whole is boiled under reflux for 4 hours. A small amount of animal charcoal is then added, and the whole is boiled for a further 15 minutes, then filtered, and the filtrate is adjusted to a pH value of 10 by means of sodium carbonate. The crystals so formed are filtered off with suction, washed well with water and dried. There are obtained 3.7 grams of 1-hydroxy-2-octadecenyl-1:2-dihydrophthalazine, which melts at 78–80° C. after recrystallization from a mixture of ether and benzene (15:1). 1 gram of the latter compound is heated with 25 cc. of methanol saturated with dry hydrogen chloride until a clear solution is obtained. Upon cooling crystals are formed, and they are recrystallized from 10 cc. of acetone. There is obtained octadecenyl-phthalazinium chloride melting at 76° C.

Example 9

2.6 grams of phthalazine and 8.8 grams of docosanyl iodide are dissolved in 60 cc. of acetonitrile and the solution is boiled under reflux for 3 days. The whole is then cooled with ice, the crystals so formed are filtered off with suction, washed with a small amount of cold acetonitrile and dried in vacuo. There are obtained 11.1 grams of docosanyl-phthalazinium iodide which melts at 105° C. after reprecipitation from acetone. 12 grams of the latter compound are dissolved in 400 cc. of warm alcohol. 120 cc. of an aqeuous solution of 10 percent strength of sodium bicarbonate are added in the warm and then 1 liter of water is added. The whole is allowed to stand for a short time at 0° C., the crystals so formed are filtered off with suction, cautiously dried in vacuo, and recrystallized from 200 cc. of a mixture of equal parts of benzene and ether. There are obtained 8.2 grams of 1-hydroxy-2-docosanyl-1:2-dihydrophthalazine melting at 83.5° C. The latter is dissolved with the aid of heat in 75 cc. of methanol and 50 cc. of a saturated solution of hydrogen chloride in methanol are added. Crystals form immediately and are filtered with suction after being cooled with ice, and then recrystallized from 800 cc. of acetone. There are obtained 6.4 grams of docosanyl-phthalazinium chloride melting at 92° C.

Example 10

10 grams of phthalazine and 20.4 grams of ω-bromundecanic acid are dissolved in 150 cc. of acetonitrile and the whole is boiled for 18 hours under reflux. It is then cooled to 0° C., the crystals formed are filtered off with suction and recrystallized from 200 cc. of absolute alcohol. There are obtained 23.8 grams of ω-carboxy-n-decyl-phthalazinium bromide melting at 166.5–167° C.

The latter compound is mixed with the quantity of sodium hydroxide solution necessary to produce an queous solution. After cooling the solution to 0° C. there is obtained a colorless oil which crystallizes rapidly. It is filtered off with suction, dried and recrystallized from aqueous methanol. This compound according to ultraviolet and infra-red spectrum analysis is ω-carboxy-n-decyl-phthalazinium hydroxide melting at 98–102° C.

Example 11

4.1 grams of phthalazine and 10 grams of ω-bromundecanic acid methyl ester are dissolved in 50 cc. of acetonitrile and boiled under reflux for 48 hours. The mixture is then cooled with ice and the precipitated crystals are filtered off with suction. By reprecipitation from 170 cc. of acetone there are obtained 9.6 grams of ω-carbomethoxy-n-decylphthalazinium bromide melting at 94–95° C. The later is dissolved in 500 cc. of warm water, and 200 cc. of an aqueous solution of 10 percent strength of sodium bicarbonate are added, and the whole is rapidly cooled to 0° C. By the addition of 100 cc. of an aqueous solution of 10 percent strength of sodium carbonate colorless crystals are precipitated, and the crystals are then washed with water and dried. There are obtained 7.3 grams of 1-hydroxy-2-(ω-carbomethoxy-n-decyl)-1:2-dihydrophthalazine, which after reprecipitation from 700 cc. of a mixture of benzene and ether (1:6) melts at 80–81° C. By dissolving the product in methanol, adding methanolic hydrochloric acid, evaporating the solvent and taking up the oily residue in acetone there is obtained ω-carboxy-n-decyl-phthalazinium chloride which melts at 100° C. after being reprecipitated several times from acetone.

Example 12

4.0 grams of ω-carboxy-n-decyl-phthalazinium bromide obtained as described in Example 10 are dissolved in 40 cc. of methanol. The whole is heated for 2 hours at the boil while introducing dry hydrogen bromide. The whole is then evaporated to dryness. The oil which remains behind crystallizes after the addition of a small amount of water. The crystals are filtered off with suction, and then dissolved in water and an excess of an aqueous solution of 10 percent strength of sodium bicarbonate is added. After cooling the mixture to 0° C., the colorless crystalline precipitate is filtered off with suction and recrystallized from ether after being dried. There is obtained 1-hydroxy-2-(ω-carbomethoxy-n-decyl)-1:2-dihydrophthalazine melting at 79–81° C. which is identical with the product of Example 11. The product can be converted into quaternary salts by the method described in that example. In a similar manner ω-carboxy-n-decyl-phthalazinium bromide may be esterified with other alcohols, preferably lower alkanols.

What is claimed is:

1. Compounds of the formula

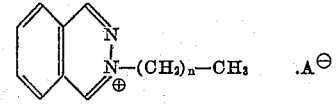

wherein $n$ represents a whole number from 9 to 21 and A stands for the anion of a therapeutically acceptable acid.

2. n-Decyl-phthalazinium quaternary ammonium salts, in which the quaternary ammonium salt anion is the anion of a therapeutically acceptable acid.

3. n-Decyl-phthalazinium chloride.

4. Lauryl-phthalazinium quaternary ammonium salts, in which the quaternary ammonium salt anion is the anion of a therapeutically acceptable acid.

5. Lauryl-phthalazinium bromide.

6. Stearyl-phthalazinium quaternary ammonium salts, in which the quaternary ammonium salt anion is the anion of a therapeutically acceptable acid.

7. Stearyl-phthalazinium chloride.

8. Docosanyl-phthalazinium quaternary ammonium salts, in which the quaternary ammonium salt anion is the anion of a therapeutically acceptable acid.

9. Docosanyl-phthalazinium chloride.

10. Docosanyl-phthalazinium iodide.

11. A member selected from the group consisting of compounds of the formula:

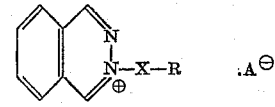

wherein X represents an acyclic, unsubstituted hydrocarbon radical containing from 4 to 30 carbon atoms and R represents a member selected from the group consisting of hydrogen, carboxy and lower carbalkoxy, and A⁻ stands for the anion of a therapeutically acceptable acid, and the pseudo bases desired therefrom.

References Cited in the file of this patent

Gabriel et al.: Ber. Deutsche Chemische Gesellschaft, vol. 28, pp. 1830–1835 (1895).